(12) United States Patent
Zaacks et al.

(10) Patent No.: US 7,064,814 B2
(45) Date of Patent: Jun. 20, 2006

(54) CHROMATIC DISPERSION MEASUREMENT AND COMPENSATION

(75) Inventors: Mark Raymond Zaacks, Petach Tikva (IL); Uri Mahlab, Neve Savyon/Yehuda (IL)

(73) Assignee: ECI Telecom Ltd., Petach Tikva (IL)

( * ) Notice: Subject to any disclaimer, the term of this patent is extended or adjusted under 35 U.S.C. 154(b) by 0 days.

(21) Appl. No.: 10/509,913

(22) PCT Filed: Apr. 10, 2003

(86) PCT No.: PCT/IL03/00301

§ 371 (c)(1),
(2), (4) Date: Oct. 4, 2004

(87) PCT Pub. No.: WO03/092194

PCT Pub. Date: Nov. 6, 2003

(65) Prior Publication Data

US 2005/0146710 A1    Jul. 7, 2005

(30) Foreign Application Priority Data

Apr. 24, 2002    (IL) .................................... 149324

(51) Int. Cl.
*G01N 21/00* (2006.01)

(52) U.S. Cl. .................................... 356/73.1

(58) Field of Classification Search .............. 356/73.1; 398/1–38, 147, 155; 385/37, 24, 10, 39, 385/31, 15

See application file for complete search history.

(56) References Cited

U.S. PATENT DOCUMENTS

| 5,406,368 A | * | 4/1995 | Horiuchi et al. ............ 356/73.1 |
| 5,815,294 A |   | 9/1998 | Ishikawa et al. |
| 6,252,692 B1 |   | 6/2001 | Roberts |
| 6,614,513 B1 | * | 9/2003 | Hoyer ...................... 356/73.1 |
| 2002/0122171 A1 | * | 9/2002 | Aoki et al. ................ 356/73.1 |

FOREIGN PATENT DOCUMENTS

JP    20002 35170    8/2000

* cited by examiner

*Primary Examiner*—Tu T. Nguyen
(74) *Attorney, Agent, or Firm*—Browdy and Neimark, PLLC

(57) ABSTRACT

The invention proposes a technique for measuring chromatic dispersion in an optical communication line transmitting an optical signal at a predetermined optical wavelength. The technique comprises determining the sign of chromatic dispersion and includes introducing controlled changes of wavelength around the predetermined wavelength, monitoring the optical signal that has passed said line, and obtaining a first and a second signals, wherein the first signal reflects changes of the carrier wavelength, and the second signal reflects changes of delay of the optical signal transmitted via the line. The two signals are compared and the chromatic dispersion sign is determined based on the phase difference there-between.

16 Claims, 4 Drawing Sheets

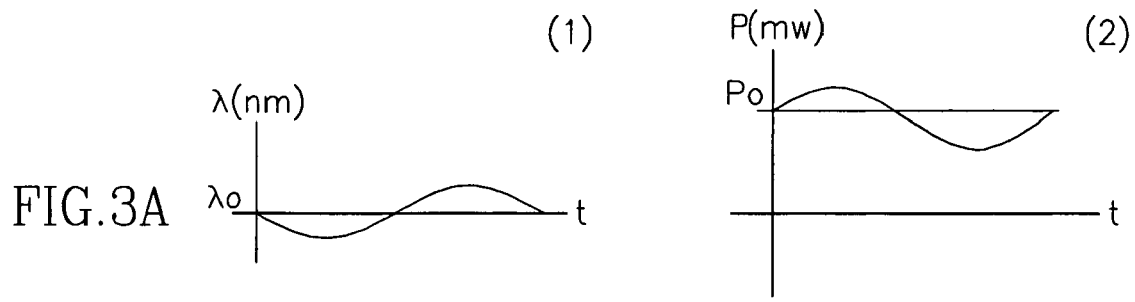
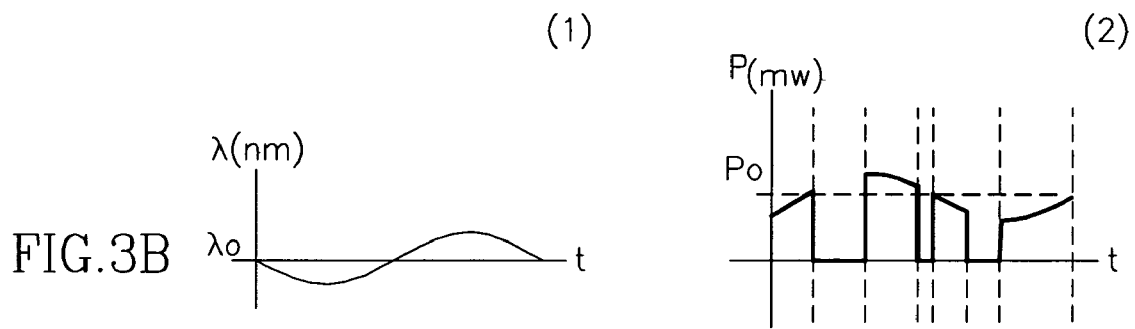
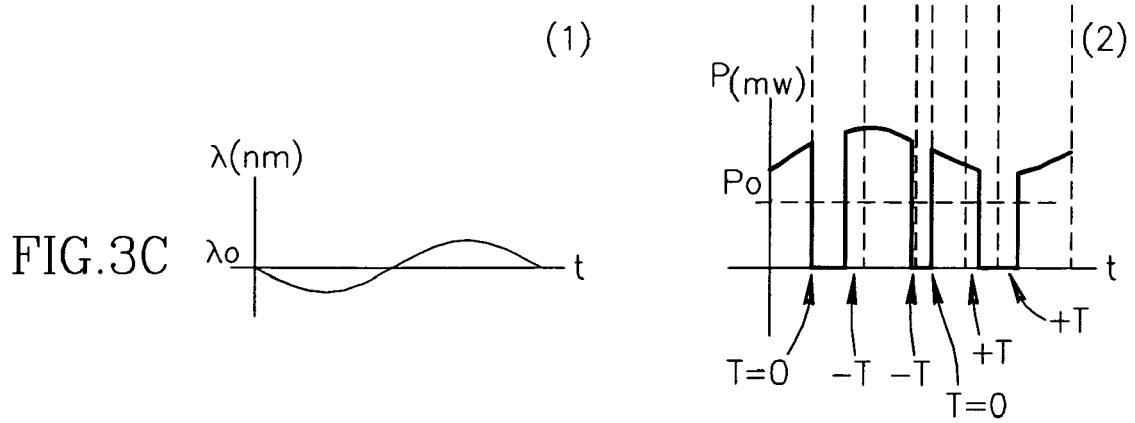
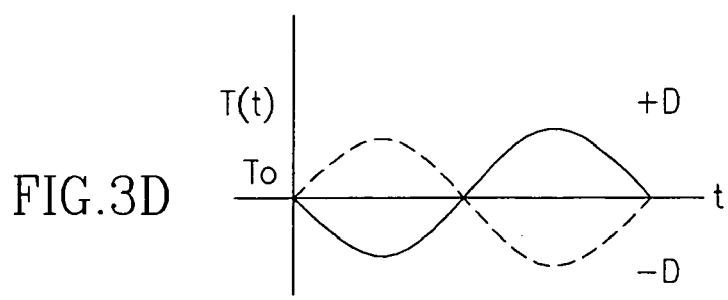

CHROMATIC DISPERSION MEASUREMENT AND COMPENSATION

FIELD OF THE INVENTION

The invention relates to a method and a system for compensating chromatic dispersion in optical communication lines.

BACKGROUND OF THE INVENTION

The fiber chromatic dispersion is a result of dependence of the fiber refractive index on the signal wavelength. Since the optical wave velocity in a fiber is given by $$V(\lambda) = \frac{c}{n(\lambda)}$$

where $V(\lambda)$ is the optical signal velocity, c is the light speed in vacuum and $n(\lambda)$ is the fiber refractive index, the signal velocity also depends on the signal wavelength.

Due to the final spectral width of any optical pulse signal, different parts of the signal will propagate through the fiber with different velocities causing pulse distortion, which will be called the signal dispersion in the frame of the present application. As a result of this, various effects appear. For example, such effects are caused by mutual interference between adjacent optical pulses within the optical channel (so-called inter-symbol interference ISI), and decrease and spread the pulse peak. These effects are considered harmful, and specific techniques are usually required for overcoming them.

For compensating the fiber dispersion, one may use fibers with the dispersion characteristics opposite to those of the standard fiber. Such fibers are usually called dispersion compensating fibers (DCF).

One alternative technique for compensating the fiber dispersion uses chirped periodic structures to create different delays between signals of different wavelengths and therefore to compensate for the fiber chromatic dispersion. This technique is presented today by the chirped fiber Bragg gratings, for example described in a Japanese patent application JP 20002 35170 A. Arrangements belonging to this technique do not create non-linear interactions, the gratings have a small size and allow for creation of variable compensation modules.

U.S. Pat. No. 6,252,692 describes an optical transmission system including means for measuring optical dispersion in an optical path, and a controllable element such as a dispersion compensator, operable in dependence on the measured value of dispersion. A low frequency dither on the optical signal causes timing jitter which varies according to the dispersion in the optical path. The timing jitter is extracted from a clock signal recovered from the optical signal. This jitter is correlated with the original dither to remove jitter effects caused by other mechanisms. Thus a value for dispersion is derived which can be used for monitoring or control purposes. The dispersion determining means comprises means for impressing a pattern on the transmitted signal; the system also comprises correlating means to correlate the timing jitter with this pattern. Provided that the pattern is asymmetric, the correlating means are arranged to determine the sign of the dispersion value.

OBJECT OF THE INVENTION

The object of the invention is to provide another technique for measurement of dispersion including determining the sign of chromatic dispersion in an optical line, and a suitable technique for the chromatic dispersion compensation.

SUMMARY OF THE INVENTION

The above object can be achieved by determining the sign of chromatic dispersion in an optical communication line suitable for transmitting an optical signal at a predetermined optical wavelength, the method comprising steps of:

introducing controlled changes of wavelength around said predetermined wavelength, monitoring the optical signal that has passed said line, and obtaining a first signal reflecting changes of the carrier wavelength of said optical signal, a second signal reflecting changes of delay of the optical signal transmitted via said line, comparing the first signal with the second signal, and determining the chromatic dispersion sign based on the phase difference between the compared first and second signals.

In the preferred version of the method, it additionally comprises transmitting data via the optical communication line using, as a carrier, the optical signal at the changing wavelength; in this version, the second signal reflects changes of delay of the data transmitted with said optical signal via said line.

The optical communication line preferably constitutes an optical fiber.

Based on the above method, another method is provided for compensating chromatic dispersion in the optical communication line, which additionally comprises the following cyclically repeating step: based on a currently determined sign of dispersion, introducing a dispersion increment having the opposite sign, up to achieving in the optical communication line the sign of the dispersion opposite to said currently determined.

Actually, in the preferred version, the method proposes catching a zero dispersion crossing point based on the dispersion sign transition, and using that as a control mechanism for obtaining a compensated, zero dispersion telecommunication line.

Alternatively, dispersion of the optical communication line can be kept close to a specific value. It can be done, say, when an over- or under-compensation of dispersion is required due to the presence of non-linear effects in the optical line. For example, it can be performed by introducing at a transmission site a delay variation synchronized with variation in the wavelength so as to create an offset in the delay variation at the receiving site. Therefore, the "detected zero crossing" will be offset to a particular pre-calibrated value.

The dispersion increment used in the method can be selected so as to provide fast and/or accurate compensation of the line dispersion and keeping it as close as possible to the selected value (zero or whatever selected). Technologies of selecting the dispersion increment are not discussed in the frame of the present application.

The above-proposed method of the dispersion compensation is particularly applicable to high speed networks, for example those transmitting data at about 40 Gbps and above. At such bitrates small fluctuations in dispersion are critical and therefore the control mechanism should track them.

Most preferably, both the method of determining the dispersion sign and the method of compensating the dispersion are performed continuously and automatically.

In order to provide monitoring of the first signal reflecting changes of the wavelength, the method may comprise (in one specific version):

obtaining the first signal by correlating power of the optical signal (so-called AM modulation), to be transmitted via the optical line, to changes of a carrier wavelength of said optical signal, wherein the carrier wavelength alters in a predetermined manner;

monitoring the power changes of said optical signal.

To correlate the power of the optical signal to the wavelength changes, one may perform current modulation of the laser producing the optical signal, or modulation of power of the optical signal after being emitted from the laser, using an external modulator. In both cases, the amplitude of this modulating signal (a so-called dither, for example periodic and symmetric, such as sinusoidal) should be correlated to the wavelength of the optical carrier. At the receiver (detector) site, the power of the optical signal can be monitored to determine the wavelength changes.

Alternatively, the monitoring of the wavelength changes can be performed by applying the optical signal to interferometer at the receiving site, or by using a filter having attenuation sensitivity depending on the signal wavelength.

To obtain the second signal reflecting delay changes created in said optical signal carrying data due to passing via the optical line, the following steps can be performed.

For example, it can be performed by passing the received optical signal via a phase lock loop (PLL) circuit, wherein corrections of the phase are provided and such corrections speak for changes of phase of the optical signal which take place due to dispersion changes in the transmission line. One should keep in mind that the dispersion changes are caused by changes in the wavelength.

As has been mentioned above, the step of comparing the first signal with the second signal is accompanied by processing the resulting phase difference to determine the dispersion sign and preferably followed by applying, to the optical line, a pre-selected dispersion increment with a sign opposite to the determined one. This can be provided by controlling an in-line dispersion compensation element.

There is also proposed a system capable of performing the above-defined method. Generally speaking, the system should include a receiving node, a transmitting node and an optical communication line connecting said nodes and suitable for transmitting an optical carrier signal at a particular wavelength, wherein the transmitting node comprises means for changing wavelength of the optical carrier signal around said particular wavelength at a predetermined manner (preferably periodically), the receiving node comprises:

means for monitoring the wavelength changes in the optical signal received via said optical line, to produce a first signal, means for monitoring phase changes caused in the optical signal received via the optical line (due to both the changed wavelength and chromatic dispersion in said line), to produce a second signal;

a phase comparator for comparing the phase of the first signal to the phase of the second signal to determine the sign of chromatic dispersion in the optical line.

Most preferably, the system also comprises means for transmitting data via said optical line using, as a carrier, said optical signal having the changing wavelength.

Preferably, the system also includes a dynamic dispersion compensation unit (DDCU) inserted in the optical line, anywhere before the receiving node and controllable by said phase comparator. Most preferably, the dynamic dispersion compensation unit is adapted to ensure zero dispersion in the optical signal incoming the receiver.

Further, there is provided a node equipment suitable for the above preferred system for performing the method according to the invention.

In electronic systems used for optical communications, the node equipment according to the invention, comprising a transmitter portion and a receiver portion, contains at its receiver portion:

means for monitoring changes of a carrier wavelength in an optical signal received via an optical line, to produce a first signal, means for monitoring phase changes in the optical signal received via the optical line, to produce a second signal;

phase comparator for comparing the phase of the first signal to the phase of the second signal to determine the sign of chromatic dispersion in the optical line.

Preferably, the node additionally comprises a dispersion compensating device controllable by said comparator.

If the wavelength changes in the transmitted signal are indicated using the AM modulation technique at the transmitter portion of a preceding node, the first signal at the receiver portion of the discussed node can be produced by AM demodulation.

The equipment for monitoring phase changes in the received optical signal may, for example, comprises a CDR (Clock and Data Recovery) circuit which usually comprises a PLL (Phase Lock Loop) circuit as a part thereof. For example, the CDR circuit may be part of an electrical deserializer (demultiplexer). Functionality of the PLL circuit is known to those skilled in the art, though such a circuit has never been used for the purpose set in the present invention.

The mentioned equipment is preferably provided per each optical channel in the receiver portion of the node.

BRIEF DESCRIPTION OF THE DRAWINGS

The invention will further be described with reference to the following non-limiting drawings, in which:

FIGS. 3A–3E present a series of time diagrams which, using a particular example, explains the principle of determining the dispersion sign according to the invention.

DETAILED DESCRIPTION OF THE PREFERRED EMBODIMENTS

Figure 1:
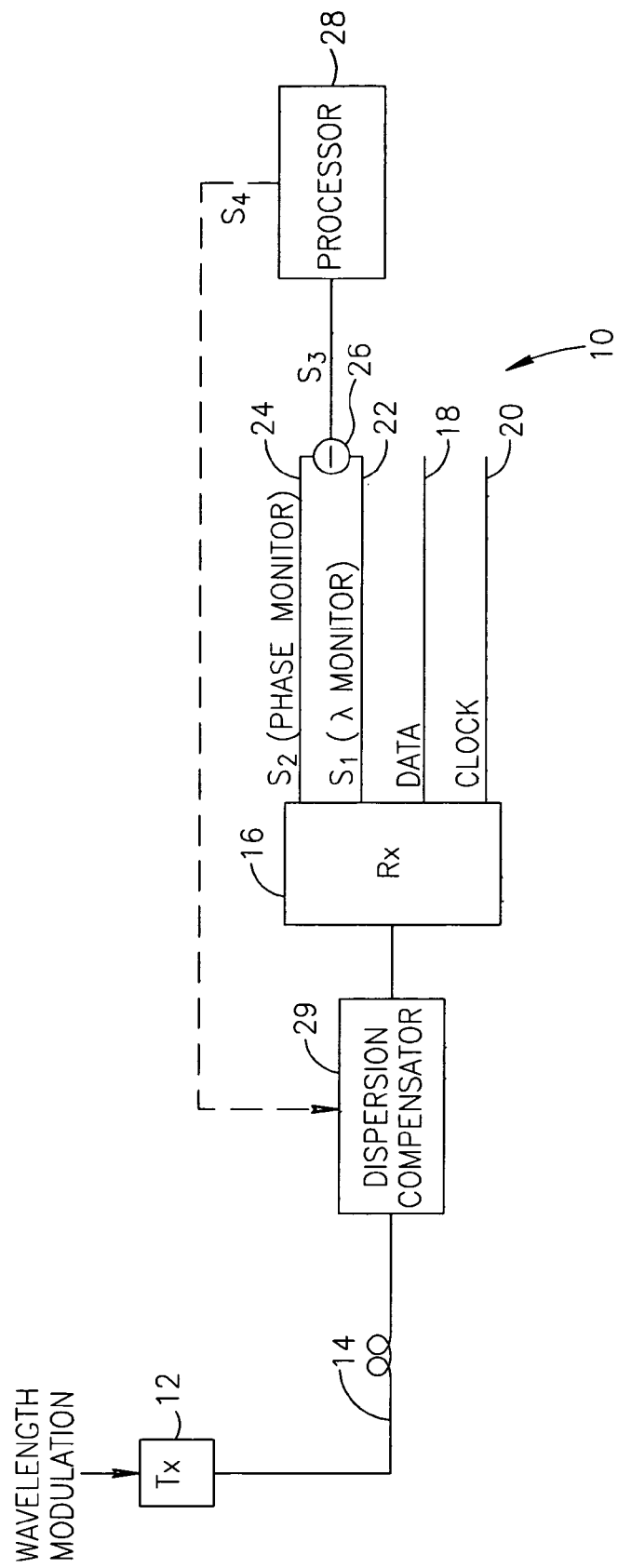
FIG. 1 is a block-diagram explaining the principle of the proposed method and system.

FIG. 1 illustrates an embodiment of a system 10 implementing the method according to the invention for determining a sign of chromatic dispersion in an optical line. The system 10 can be called a dispersion sign monitor and may optionally perform automatic dispersion compensation. In the system, a transmitter Tx 12 transmits, via an optical fiber line 14, an optical signal at a carrier wavelength $\lambda$ (the optical signal suitable for carrying data). Preferably but not obligatory, data is transmitted using the optical carrier signal. The wavelength is modulated at the transmitter 12, say, using a small dither. A receiver Rx marked 16, upon receiving an input optical signal, provides a number of outputs including: data output 18, clock output 20, λ-monitoring output 22 and phase monitoring output 24. The illustrated number of outputs is exemplary and non-exhaustive.

According to the invention, the output 22 carries a signal (a first monitoring signal S1) reflecting changes of the carrier wavelength, if such occur.

It should be kept in mind that delay of the optical signal in the line is mainly caused by chromatic dispersion of the optical signal, and when the wavelength of the signal changes, the delay of the optical signal will change as well. To this end, the output 24 carries a signal (a second monitoring signal S2), which represents the optical signal delay. If data is transmitted via the line, the signal 24 represents the data delay. So, if any changes of chromatic dispersion take place, that will be reflected in the second signal S2.

According to the invention, the sign of the dispersion can be determined knowing the phase relation between the wavelength changes and the data delay, i.e., between signal S1 and signal S2. To illustrate this fact, characteristic changes of the data delay will be shown in some of FIG. 3 to demonstrate clear dependence thereof on the sign of dispersion of the transmission line.

To check the phase relation between the signals S1 and S2, a phase comparator 26 compares the first and the second monitoring signals thus producing a third signal S3 which can be used for determining the sign of the dispersion. S3 is translated by a processor 28 which, firstly, is able to explicitly obtain the sign of the dispersion. Secondly and preferably, the processor 28 is capable of producing, according to a predetermined algorithm, a signal S4 which can be used for controlling a dispersion compensation block 29 which is positioned anywhere in the fiber between the transmitter 12 and the receiver 16, and terminates a feedback loop of the dispersion sign monitor 10. The signal S4 is informative both on the direction (sign) and the amount of the dispersion to be corrected. Preferably, the amount of correction is a pre-selected dispersion increment which is sufficiently small to achieve the accurate dispersion compensation.

Figure 2:
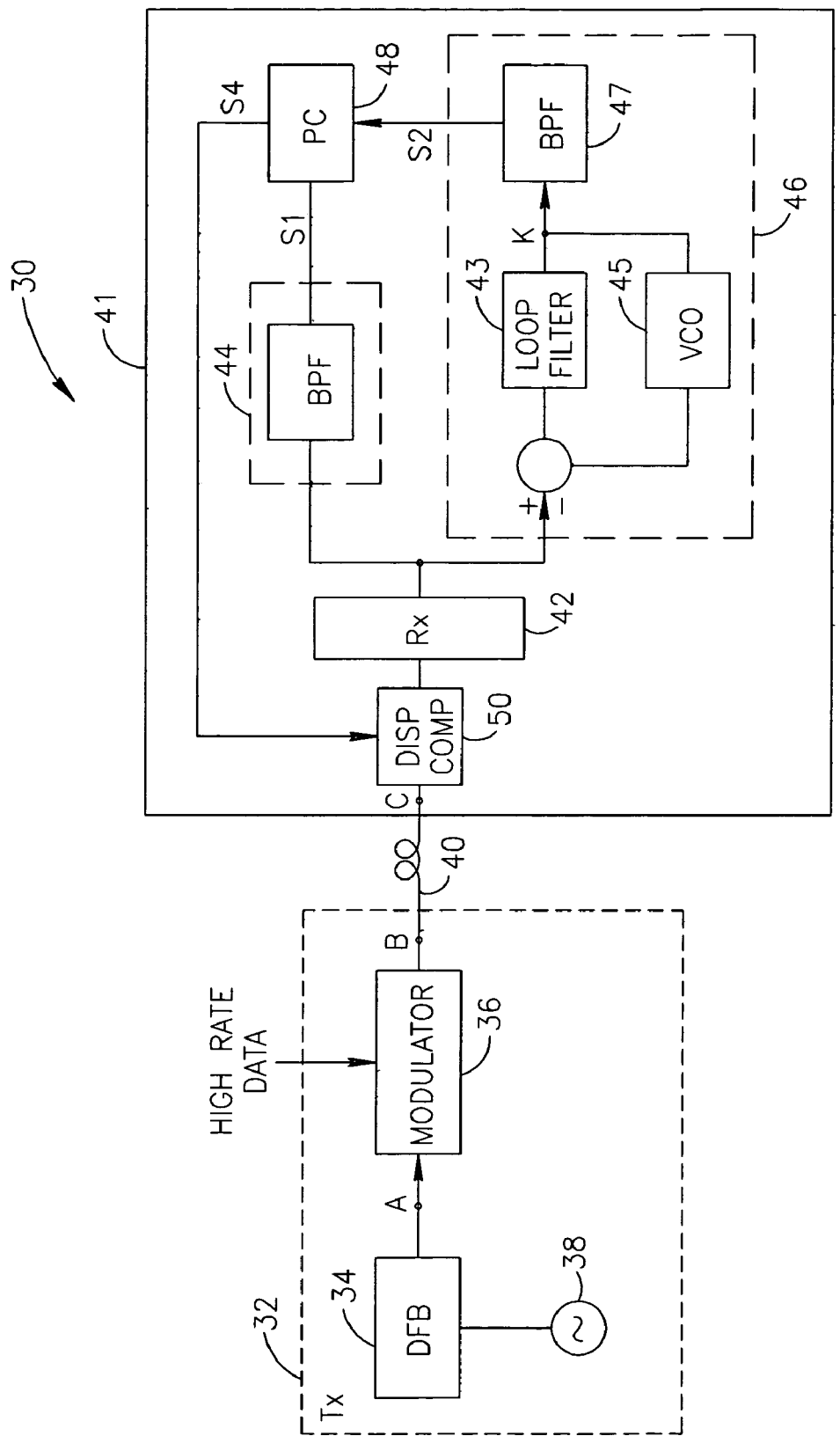
FIG. 2 is a block diagram demonstrating one implementation of the above principle for determining the sign of dispersion.

FIG. 2 illustrates one particular embodiment 30 of the dispersion sign monitor shown in FIG. 1. In parallel, there will be explained time diagrams shown in FIGS. 3A–3E. The transmitter portion 32 comprises, for example, a DFB (Distributed Feedback laser) 34, followed by a modulator 36 which modulates the carrier wavelength produced by the laser 34 by high rate data. In order to introduce controlled changes in the carrier wavelength, the transmitter portion is provided with a dither block 38. For example, the current of the DFB laser is modulated using a sinusoidal dither added to the laser bias current. In this particular example, the dither sinusoidal current signal can be given by $I(t)=I_o \sin(\omega t)$. The dither creates modulation of optical power and wavelength λ at the output of the DFB laser, the wavelength change occurs due to a so-called adiabatic chirp.

Time diagrams of the parameters at point (A) of the monitor are shown in FIG. 3A as follows: the changing wavelength λ is shown as FIG. 3A (1), and the carrier wavelength optical signal, with its dither modulated power around a given power $P_o$ is shown in FIG. 3A (2).

Since the dither modulation of power and wavelength have opposite effects, the waveforms are opposite in sign.

The carrier wavelength optical signal is then passed through the external modulator 36 where it is modulated by data at high bit rate (say, 40 Gbps). At the point (B) the wavelength continues to change as it did at point A (the diagram 3B(1)). The resulting optical signal obtained upon the data modulation at point (B) is presented by the time diagram 3B(2). One may note that the optical signal carries a sequence of "1" and "0" intervals, according to the data impressed by the modulator 36. (The relative time scale representation of the dither and data is intentionally exaggerated to facilitate the explanation).

When the signal passes through a fiber 40, the wavelength-shift, due to the dispersion of the fiber, creates phase shift in the base-band signal, which can be seen as the data delay.

The delay function in the baseband is most simply given as:

$$T(t)=DL\lambda(t)+T_0 \qquad (1),$$

where

T—delay of the baseband signal, measured in ps,

L—length of the fiber line, in km,

D—dispersion of the fiber, measured in ps/nm/km, $T_0$—the constant group delay in the fiber, measured in ps.

Since in this example, the dither current added to the laser bias current has a sine waveform $I_0 \sin(\omega_B t)$ modulated at angular frequency $\omega_B$ and amplitude $I_0$, the power emitted from the laser is also modulated by a sine wave given by:

$$P(t)=P_A \sin(\omega_B t)+P_0 \qquad (2),$$

where $P_A$—is amplitude of the modulated optical output power, $P_0$—is average optical power, In addition, the wavelength is modulated at the DFB and is given by:

$$\lambda(t)=K_{FM} I_0 \sin(\omega_B t)+\lambda_0 \qquad (3),$$

where $K_{FM}$—is a frequency modulation constant of the laser (usually negative), measured in nm/mA.

It should be noted that the equations (2) and (3) are proportional and may both serve the above-mentioned signal S1.

Based on the above, the delay of the baseband signal is given by:

$$T(t)=DLK_{FM} I_0 \sin(\omega_B t)+T_0 \qquad (4),$$

The sign of the delay is dependent on D; the function T(t) can be compared to the function P(t).

The time diagrams at point "C", as received by the receiver 42, demonstrate that:

the wavelength changes as before—time diagram 3C (1);

the modulated optical signal shown in the exaggerated scale in the time diagram 3C(2) demonstrates changes in the phase caused by the fiber dispersion; it indicates delays with respect to the signal which entered the fiber (3B(2)).

As can be seen, for positive dispersion (+D) at the portions of the received signal corresponding to those halves of the sine wave when the carrier wavelength is more than the average (nominal), the delay of the modulated signal increases and reaches its maximum when the wavelength is maximally differs from the average. To the contrary, at the portions of the signal, corresponding to the halves of the sine wave where the carrier wavelength is less than the average, the data delay has a different sign and also reaches its maximum when the wavelength maximally differs from the average. This can easily be seen in the graphs "C" according to equation 1.

Since changes in the wavelength cause changes in the data delay, the phase differences between the signal representing the wavelength changes λ (t) and the signal representing the data delay T(t)—will represent the sign of the dispersion.

It should be noted that the above time diagram in 3C (2) is built for positive dispersion of the fiber. If the dispersion sign is negative, the delay function will behave in the opposite manner.

It can be shown in the following FIG. 3D. The figure illustrates that T(t) is synchronous with the changing carrier wavelength λ. The solid line represents behavior of the delay when the dispersion is positive, and the dotted line—when the dispersion is negative.

Returning to FIG. 2, equipment of a network node according to the invention, suitable for performing the proposed method, is schematically marked 41. At the receiver's 42 portion of the node, the modulated optical signal is interpreted in two detectors: AM detector 44 and PLL 46 used as a phase detector.

The PLL is used to track the phase variation of the input signal, thus the signal at the output of the Loop Filter 43 (point K) represents a time derivative of the phase due to operation of VCO 45 (Voltage Controlled Oscillator) which acts as a phase integrator.

At point K, the time derivative of the delay is obtained at all frequencies composing the incoming signal, including the frequency of the dither. This signal thus contains noise at all frequencies and has to be filtered using the band-pass filter BPF 47 of the PLL detector 46. The filtered signal is marked S2 and has a phase shift of $\pi/2$ due to the derivative operation described above.

The AM detector 44 is a simple band-pass filter (BPF) which filters out the AM tone and forms the first signal S1. This tone, S1, is further phase compared to the tone S2.

Figure 3E:
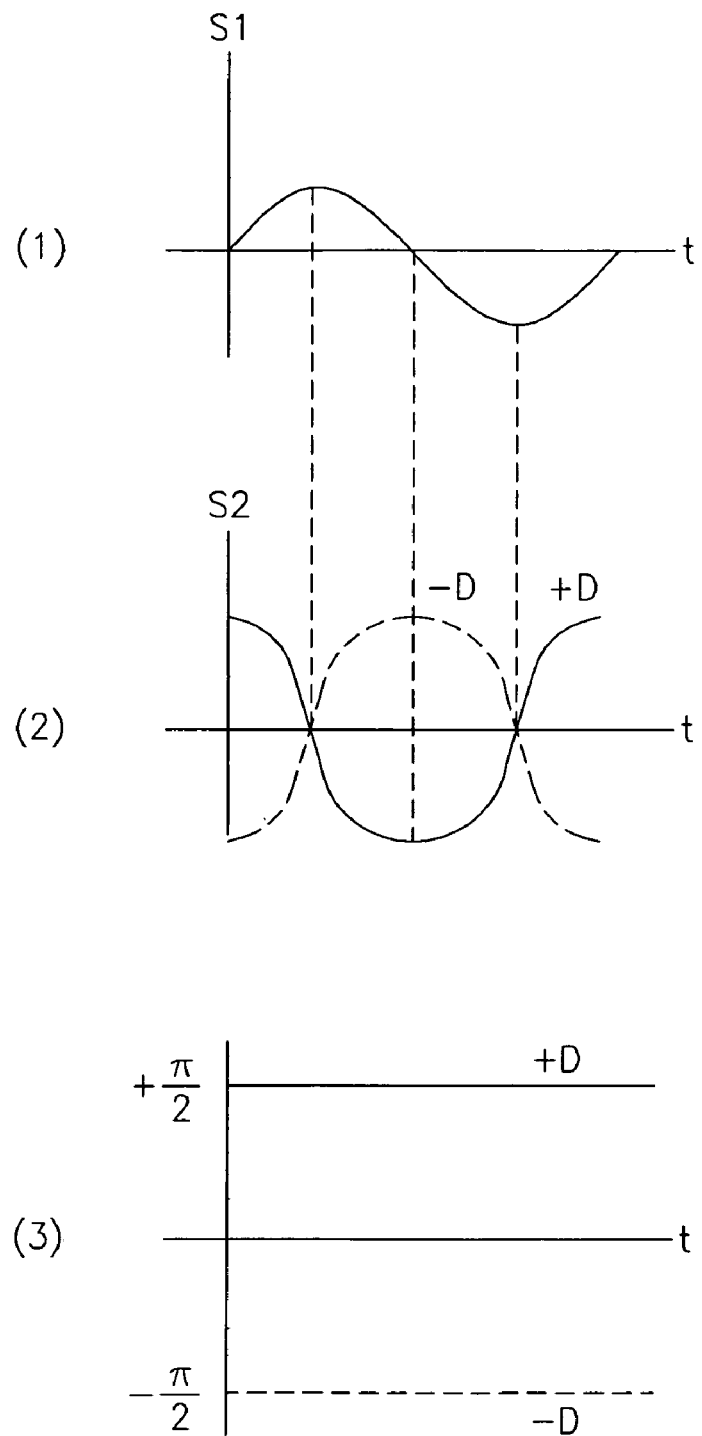

A phase comparator PC 48 determines the sign of the dispersion monitored. Schematically, this process is shown in FIG. 3E, where the signal S1 (3E(1)) is compared to signal S2 (3E(2), solid line) being the derivative of the delay signal, at a positive dispersion of the fiber line. The S2 in the case of a negative dispersion is shown as the symmetric dotted curve at the same diagram.

In the ideal case, the resulting phase between S1 and S2 is $\pi/2$ for D>0, and $-\pi/2$ for D<0. The phase comparator (PC) 48 obtains the phase difference (S2–S1) and determines the sign of the dispersion D. The basis of the decision making is illustrated in FIG. 3E(3).

In a non-ideal case, the phase difference between S1 and S2 will always be a fixed but random phase due to a phase introduced by all electrical components of the circuit. However, the phase difference detected between S1 and S2 will always constitute a difference of "$\pi$" between the cases of positive and negative dispersion.

According to the determined sign of dispersion, the PC 48 is capable of activating a Dispersion Compensating block 50 for correcting the received optical signal. Optionally, the PC 48 or the block 50 may comprise processing means for selecting a proper dispersion increment for further compensation of the dispersion. The increment may have an adaptive step size.

If there is a specific task to bring the fiber line dispersion to zero, the block 50 may repetitively introduce into the optical fiber line a pre-selected or a changing dispersion increment having the opposite sign up to the moment when the sign of dispersion in the line changes. From that moment, the correction will automatically be performed in the opposite direction, so the dispersion is dynamically kept close to zero.

If another task is set, for example the dispersion is to be over- or under-compensated for optimizing the optical line operation in case of presence non-linear effects, the correction can be performed so as to maintain any pre-selected dispersion value. It can be performed, for example, by inducing a delay variation at the transmission site, synchronized to the wavelength variations.

It should be appreciated that other versions of the proposed inventive method, and other embodiments of the proposed system and equipment may exist, that are to be considered part of the invention. The inventive concept is further defined by the claims, which follow.

The invention claimed is:

1. A method for measurement of chromatic dispersion in an optical channel of an optical communication line, suitable for transmitting an optical signal at a predetermined optical wavelength being a carrier wavelength of said optical channel, the method comprising steps of:
   introducing controlled changes of wavelength around said predetermined wavelength,
   monitoring the optical signal that has passed said line, and obtaining from said optical signal:
      a first signal dynamically reflecting changes of the carrier wavelength of said optical signal,
      a second signal dynamically reflecting changes of delay of the same said optical signal transmitted via said line, comparing the first signal with the second signal, and determining the chromatic dispersion sign based on the phase difference between the compared first and second signals.

2. The method according to claim 1, additionally comprising transmitting data via the optical communication line using, as a carrier, the optical signal at the changing wavelength; in the method, the second signal reflects changes of delay of the data transmitted with said optical signal via said line.

3. The method according to claim 1, additionally comprising the following step:
   based on the determined sign of dispersion, repeatedly introducing a dispersion increment having the opposite sign, up to the opposite sign of the dispersion is determined in the optical communication line,
   thereby compensating chromatic dispersion in the optical communication line.

4. The method according to claim 1, additionally comprising the following steps:
   introducing at a transmission site a delay variation synchronized with variation in the wavelength so as to create an offset in the delay at a receiving site, and
   based on the determined sign of dispersion, repeatedly introducing a dispersion increment having the opposite sign, up to the opposite sign of the dispersion is determined in the optical communication line,
   thereby keeping dispersion of the optical communication line close to a specific value.

5. The method according to claim 3, comprising selecting the dispersion increment to provide accurate compensation of the dispersion and keeping it as close as possible to a predetermined value.

6. The method according to claim 1, being performed continuously and automatically.

7. The method according to claim 1, wherein, for introducing controlled changes of the wavelength, the method comprises introducing a dither by changing the wavelength of said optical signal to be transmitted in a periodic manner around the predetermined wavelength.

8. A system for measurement of chromatic dispersion in an optical channel of an optical line, the system including a receiving node, a transmitting node and the optical line connecting said nodes and intended for transmitting an optical signal at a particular optical carrier wavelength of said optical channel, wherein the transmitting node comprises means for controlled changing wavelength of the optical carrier around said particular wavelength at a predetermined manner, and for transmitting the optical signal by said changing optical carrier via the optical line, the receiving node comprises:

means for monitoring dynamic wavelength changes in the optical signal of said optical channel received via the optical line, to produce a first signal, means for monitoring dynamic phase changes caused in the optical signal of said optical channel received via the optical line, to produce a second signal;

a phase comparator for comparing the phase of the first signal to the phase of the second signal to determine the sign of chromatic dispersion in the optical channel of the optical line.

9. The system according to claim 8, further comprising means for transmitting data via said optical line using said optical signal having the changing wavelength, as a carrier.

10. The system according to claim 8, including a dispersion compensation unit inserted in the optical line and controllable by said phase comparator.

11. The system according to claim 10, wherein the dispersion compensation unit is adapted to ensure zero dispersion in the optical signal incoming the receiving node.

12. The system according to claim 8, wherein the controlled changes of the wavelength are introduced by using a periodic symmetric dither at the transmitter node.

13. A receiving node equipment suitable for measurement of chromatic dispersion in an optical channel of an optical communication line, while an optical signal is transmitted between a transmitting node and a receiving node at an optical carrier wavelength of said optical channel, wherein said wavelength being controllably changed, the receiving node equipment comprising:

means for monitoring dynamic changes of the carrier wavelength in said optical signal received via the optical channel of said optical line, to produce a first signal, means for monitoring dynamic phase changes in the optical signal received via the optical channel of said optical line, to produce a second signal; and a phase comparator for comparing the phase of the first signal to the phase of the second signal to determine the sign of chromatic dispersion in the optical channel of said optical line.

14. The receiving node equipment according to claim 13, additionally comprising a dispersion compensating device controllable by said phase comparator.

15. The receiving node equipment according to claim 13, wherein the first signal is produced by AM demodulation, provided that the controlled wavelength changes are introduced using the AM modulation technique at the transmitting node.

16. The receiving node equipment according to claim 13, wherein the means for monitoring phase changes in the received optical signal comprises a PLL (Phase Lock Loop) circuit.

* * * * *